(Model.)
O. F. STEDMAN.
SAWING MACHINE.
No. 287,975. Patented Nov. 6, 1883.
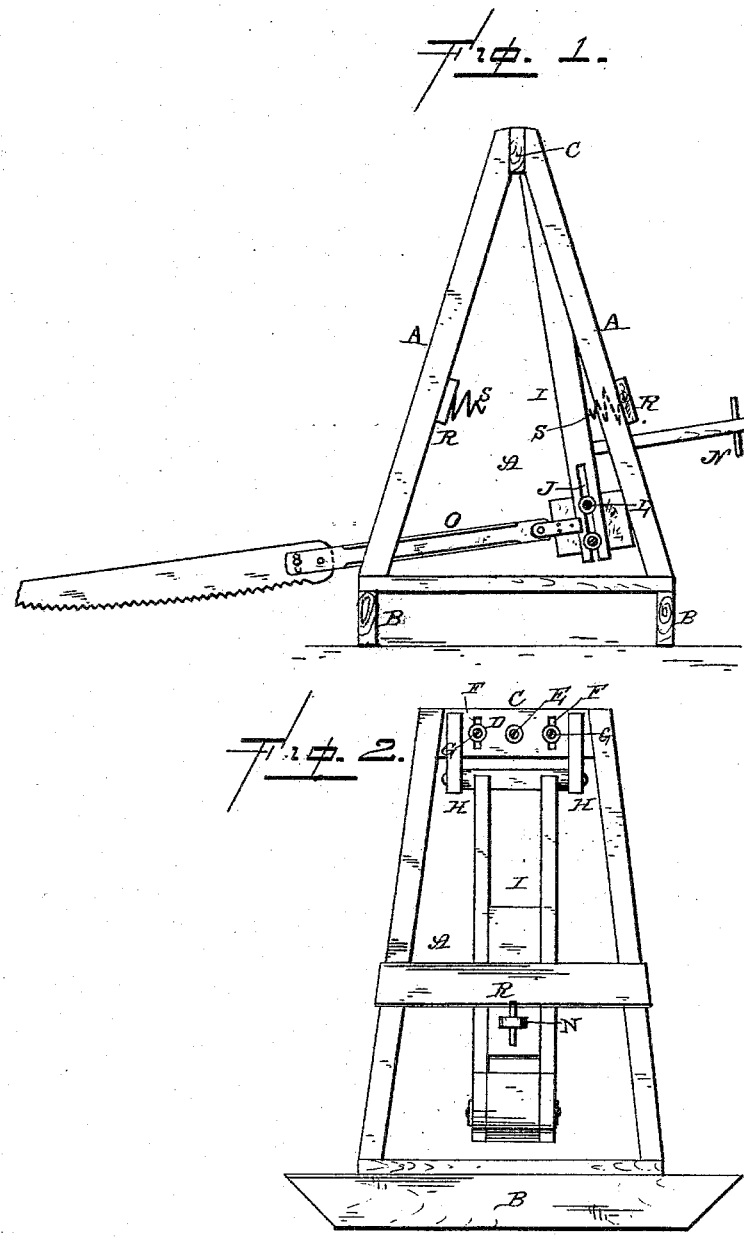

UNITED STATES PATENT OFFICE.

OSCAR F. STEDMAN, OF FREDONIA, NEW YORK.

SAWING-MACHINE.

SPECIFICATION forming part of Letters Patent No. 287,975, dated November 6, 1883.

Application filed March 27, 1883. (Model.)

*To all whom it may concern:*

Be it known that I, OSCAR F. STEDMAN, of Fredonia, in the county of Chautauqua and State of New York, have invented certain new and useful Improvements in Sawing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in sawing-machines; and it consists, first, in the combination of a suitable supporting-frame, a pendant, to the lower end of which the saw is connected, and an adjusting device, by means of which the saw can be adjusted into a horizontal position, no matter what the position of the supporting-frame may be; second, in the combination of the saw with a weighted pendant, whereby, when the saw is once started in motion, it can be kept moving with but little exertion upon the part of the operator; third, in the combination of the adjusting-frame provided with suitable coiled springs upon opposite sides, and a weighted pendant to which the saw is connected, whereby as the pendant swings back and forth it is made to strike against the springs, and thus, acting in conjunction with the weight, keeping up a uniform momentum, and gives an equal motion to the saw.

The object of my invention is to provide a cheap and simple sawing-machine in which the pendant can be adjusted into a vertical position, and in which a weight and suitable springs are employed to assist the operator in keeping the pendant moving after it has once been started.

Figures 1 and 2 are side elevations of my invention, taken at right angles to each other.

A represents a suitable derrick or frame, which may be either of the form here shown or any other that may be preferred, and which is supported upon the runners B. These runners extend at right angles to the motion of the saw, and serve both as supports for the derrick and as runners by means of which the saw may be drawn from place to place, as may be desired.

The upper ends of the uprights which form the frame are connected together by means of the cross-piece C, and this cross-piece forms the support for the saw. In order to provide a means whereby the saw may be adjusted into a horizontal position, no matter at what angle the frame may be placed by the inequalities of the ground, I attach to this cross-piece C the pivoted adjusting-piece D. This piece D is pivoted at its center by means of the bolt E, and has a circular slot, F, drawn in a circle from its center, at each of its ends, through which suitable clamping bolts or screws, G, are passed. By loosening these screws and adjusting this piece D so that the pendant will hang in a perpendicular position, and then tightening up the screws or bolts so as to clamp the piece D in place, the pendant will always move freely and with as little friction as possible. At each end of this adjusting-piece D is secured a suitable bracket, H, in the lower ends of which the pendant is journaled.

As here shown, the pendant I is formed of two vertical rods or pieces, which are connected together at their upper ends and at or near their centers; but, if so preferred, this pendant may be formed of but a single piece. The lower ends of each of the rods or bars which form this pendant are slotted, as shown at J, and through these slots are passed the clamping bolts or screws L, which hold the vertically-adjustable weight in position. This weight is attached to the lower end of the pendant for the purpose of giving a greater momentum to the movement of the pendant, and thus enabling the operator to keep up the movement after it is once begun with but very little exertion to himself. The weight is made vertically adjustable upon the pendant, for the purpose of giving a greater or less throw, according to the amount of work to be done.

If the pendant is made from a single bar or rod, as above described, it may be passed through the center of the weight, and then the weight be made vertically adjustable by any well-known means for that purpose.

To the pendant is attached the handle N, by means of which the operator is enabled to swing the pendant back and forth, and to the front side of the weight is attached the connecting-rod O, for the saw. When the weight is adjusted up and down, the saw is adjusted vertically with it, and thus the saw can be placed at any desired angle to the log upon which it is to operate.

To the inner sides of the cross-pieces R, which are rigidly secured to the frame A, are the coiled springs S, against which the sides of the pendant strike as it is moved back and forth after it is once started in operation. These springs are more or less compressed when the pendant strikes against them, and then as they rebound they throw the pendant in an opposite direction, and thus, acting in conjunction with the weight, they enable a steady and active movement of the saw to be kept up with comparatively little effort to the operator. The operator has but to adjust his machine in relation to the log, or the log in relation to the machine, as may be most convenient, lower the saw upon it, and then catch hold of the handle and keep the pendant in motion, when the saw will sever the log.

Having thus described my invention, I claim—

1. In a sawing-machine, the combination of the pendant provided with the slots J, with a weight which is adjustable upon the lower ends of the pendants, with the saw O and the hand-lever N, attached to the pendant, for moving the saw back and forth, substantially as shown.

2. In a sawing-machine, the combination of the derrick or frame A, provided with the stationary cross-piece C at its upper end, with the pivoted adjusting-piece D, provided with the slots F, clamping devices G, and the brackets H, in which the pendants I are journaled, substantially as described.

3. The combination of the frame A, the piece D, pivoted upon one side of its upper end, and provided with suitable slots, and clamping bolts and screws which are passed through the slots, the pendant which is attached to this piece D, and the weight which is attached to the lower end of the pendant, substantially as specified.

4. The combination of the supporting-frame, the pivoted piece D, which is attached to its upper end, and provided with slots and adjusting-screws, the pendant which is attached to the part D, and suitable coil-springs which are secured to opposite sides of the frame, and against which the pendant strikes as it is moved back and forth, substantially as shown.

5. In a sawing-machine, the combination of the frame, the coiled springs attached thereto, and a weighted pendant which is made to move back and forth between the springs, and which has the saw connected to it, substantially as set forth.

In testimony whereof I affix my signature in presence of two witnesses.

O. F. STEDMAN.

Witnesses:
B. F. SKINNER,
E. A. CURTIS.